United States Patent [19]

Shovlin et al.

[11] Patent Number: 4,652,882
[45] Date of Patent: Mar. 24, 1987

[54] RECEIVER WITH WIDE DYNAMIC RANGE

[75] Inventors: Thomas D. Shovlin, Arlington, Mass.; Arthur J. Torino, Jr., Merrimack, N.H.; Donald W. Goodman, North Billerica; William C. Brown, Jr., Littleton, both of Mass.

[73] Assignee: Raytheon Company, Lexington, Mass.

[21] Appl. No.: 431,898

[22] Filed: Sep. 30, 1982

[51] Int. Cl.$^4$ .............................................. G01S 13/44
[52] U.S. Cl. .................................... 342/150; 342/93
[58] Field of Search ................ 343/16 M, 7 A, 7 AG, 343/5 FT; 328/116, 117, 162, 163; 307/351, 352, 353, 355, 357, 358

[56] References Cited

U.S. PATENT DOCUMENTS

| | | | |
|---|---|---|---|
| 3,609,397 | 9/1971 | Zaman, III | 307/351 |
| 3,701,152 | 10/1972 | Howard | 343/16 M |
| 3,875,391 | 4/1975 | Shapiro et al. | 364/200 |
| 3,921,171 | 11/1975 | Strother, Jr. et al. | 343/16 M |
| 3,921,173 | 11/1975 | Thomson | 343/16 M |
| 3,927,406 | 12/1975 | Bruder | 343/16 M |
| 3,977,000 | 8/1976 | Wagner | 343/16 M |
| 4,131,254 | 12/1978 | Underwood | 343/16 M |
| 4,172,240 | 10/1979 | Jerinic | 331/56 |
| 4,208,632 | 6/1980 | Sheldon et al. | 328/117 |
| 4,225,865 | 9/1980 | McPherson | 343/16 M |
| 4,298,841 | 11/1981 | Dishal | 307/351 X |
| 4,317,080 | 2/1982 | Acker | 328/116 |
| 4,373,140 | 2/1983 | Chin | 307/351 |
| 4,394,659 | 7/1983 | Gellekink | 343/16 M |

Primary Examiner—T. H. Tubbesing
Assistant Examiner—Gilberto Barrón, Jr.
Attorney, Agent, or Firm—Philip J. McFarland

[57] ABSTRACT

A monopulse receiver, wherein a desired wide dynamic range is achieved for range gated monopulse sum and difference signals, is shown to incorporate: (a) a multiplexer for time-multiplexing such signals; (b) a first and a second receiver channel responsive to the time-multiplexed signals, each such channel having a dynamic range less than the desired wide dynamic range and greater than one-half the desired wide dynamic range, the gains in such channels being offset so that together such channels have the desired dynamic range; (c) a first and a second sampler and analog-to-digital converter, respectively, responsive to the signals out of the first and the second receiver channel, for producing digital words indicative of the amplitude of each component signal in the time-multiplexed signals; and (d) logic and control means for forming bytes from predetermined portions of each one of the digital words and for selecting the byte indicative of the amplitude of each component signal.

1 Claim, 5 Drawing Figures

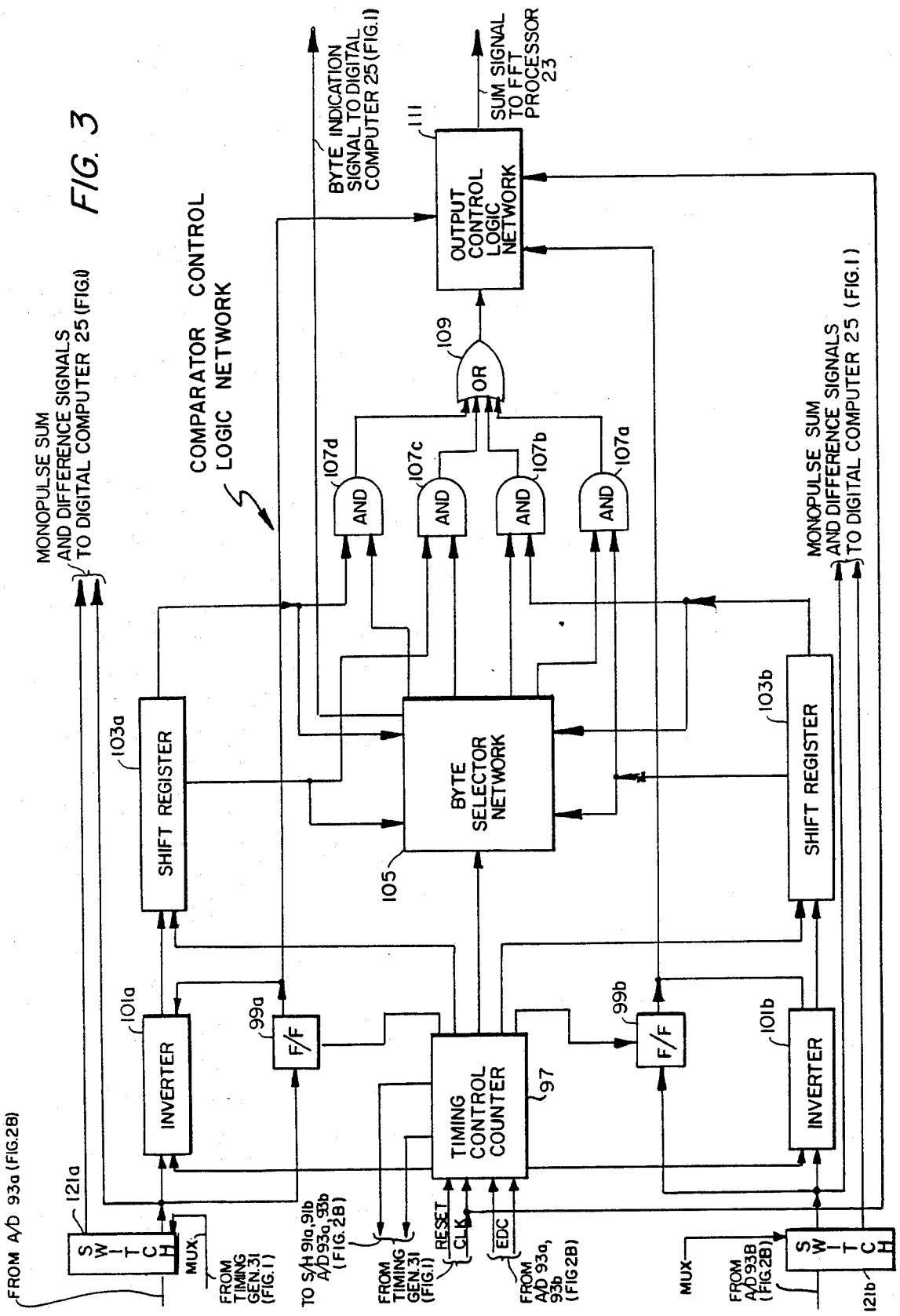

RECEIVER WITH WIDE DYNAMIC RANGE

BACKGROUND OF THE INVENTION

This invention pertains generally to pulse Doppler radar receivers, and more particularly to an improved receiver intended for use with a Fast Fourier Transfor (FFT) processor without any need for automatic gain control.

As is known in the art, automatic gain control (AGC) circuitry is usually incorporated in a pulse Doppler radar receiver, especially one intended for use in a missile seeker, in order that such a receiver may operate effectively in an environment in which a desired signal must compete with undesired signals (such as jamming signals, clutter and signals from unwanted targets) over a wide dynamic range. In such a receiver, all input signals are first impressed on a bank of roughing filters (centered on the target Doppler frequency), and the signals passed through such filters are then impressed on an intermediate frequency (I.F.) amplifier incorporating so-called "fast" AGC circuitry to provide signals for an analog-to-digital (A/D) converter with a limited dynamic range. If the AGC loop closeout frequency is greater than the bandwidth of the roughing filters, the AGC loop will effectively normalize all signal level variations existing at the output of the roughing filters so that the A/D converter may operate properly.

Although a receiver with fast AGC circuitry is effective against jamming signals, slow AGC circuitry is better suited for operation when signals from a number of targets are present or a desired target is in clutter. In the latter such situations, the simumtaneous presence of more than one target line in the roughing filter bandwidth will appear to fast AGC circuitry as a variation in signal level with the result that the AGC circuitry will respond to suppress the apparent signal level variations, thereby causing cross-modulation distortion or signal spreading losses and creating false target lines. The net effect is often a loss of target track. On the other hand, although a slow AGC loop following the roughing filters is desirable to handle the multiple target and target in clutter situations, a slow AGC loop is vulnerable to saturation, with an attendant excessively long recovery time when jamming signals are received.

The dichotomy between fast and slow AGC has heretofore been resolved by using a receiver without any AGC loops, but with a dynamic range wide enough to avoid saturation under any operating conditions. Such a receiver may, for example, be similar to the one shown in U.S. Pat. No. 4,208,632, Sheldon et al, issued June 17, 1980 and assigned to the same assignee as the present application. In that receiver, the monopulse sum signal out of the roughing filters is first downconverted to a video signal which is then divided to produce four separate baseband video signals amplitude-weighted to provide a total of 102 dB of dynamic range. Each of the four separate baseband video signals then is sampled in a set of four identical sample/hold circuits. A window comparator and a control logic network then are operative to determine and select the sample/hold circuit containing the largest sample value which is less than full scale, which sample is passed, via an 8 bit A/D converter, to an FFT signal processor. A 2 bit exponent word is also passed to allow the selected sample to be appropriately scaled within the FFT signal processor. The value of the 8 bit A/D output is multiplied, by 8 raised to the number of the channel selected, to reconstruct the original signal. However, gain and phase errors between adjacent channels distort such reconstruction when the signal amplitude varies between ranges. A 5 bit overlap between adjacent channels is provided to moderate this distortion.

SUMMARY OF THE INVENTION

With this background of the invention in mind, it is therefore a primary object of this invention to provide an improved pulse Doppler receiver without a conventional AGC loop wherein the distortion between the receiver channels is reduced.

It is another object of this invention to provide a pulse Doppler receiver having a digital interface unit that accepts the 12 bit digital data from a pair of input channels and provides four 8 bit output signals.

These and other objects of this invention are generally attained by providing, in a pulse Doppler receiver, an interface unit, including a comparator/control logic network wherein each one of the signals from the roughing filters is first divided into two channels and then is downconverted to baseband video signals. The baseband video signals in each channel are amplified prior to being sampled by a 12 bit sample/hold circuit and digitized by a 12 bit A/D converter. The 12 bit digital data from each of the channels are passed to the comparator/control logic network which is effective to convert the two 12 bit data channels into four 8 bit data channels, select the proper 8 bit channel for inputting to the signal processor, and provide a data input to the signal processor which is an 8 bit data word together with a 2 bit exponent indicating which of the four channels was selected.

BRIEF DESCRIPTION OF THE DRAWINGS

Other objects and many of the attendant advantages of this invention will be readily appreciated as the same becomes better understood by reference to the following detailed description when considered in connection with the accompanying drawings, wherein:

FIG. 3 is a simplified block diagram of the comparator/control logic network shown in FIG. 2B.

DESCRIPTION OF THE PREFERRED EMBODIMENT

Figure 1:
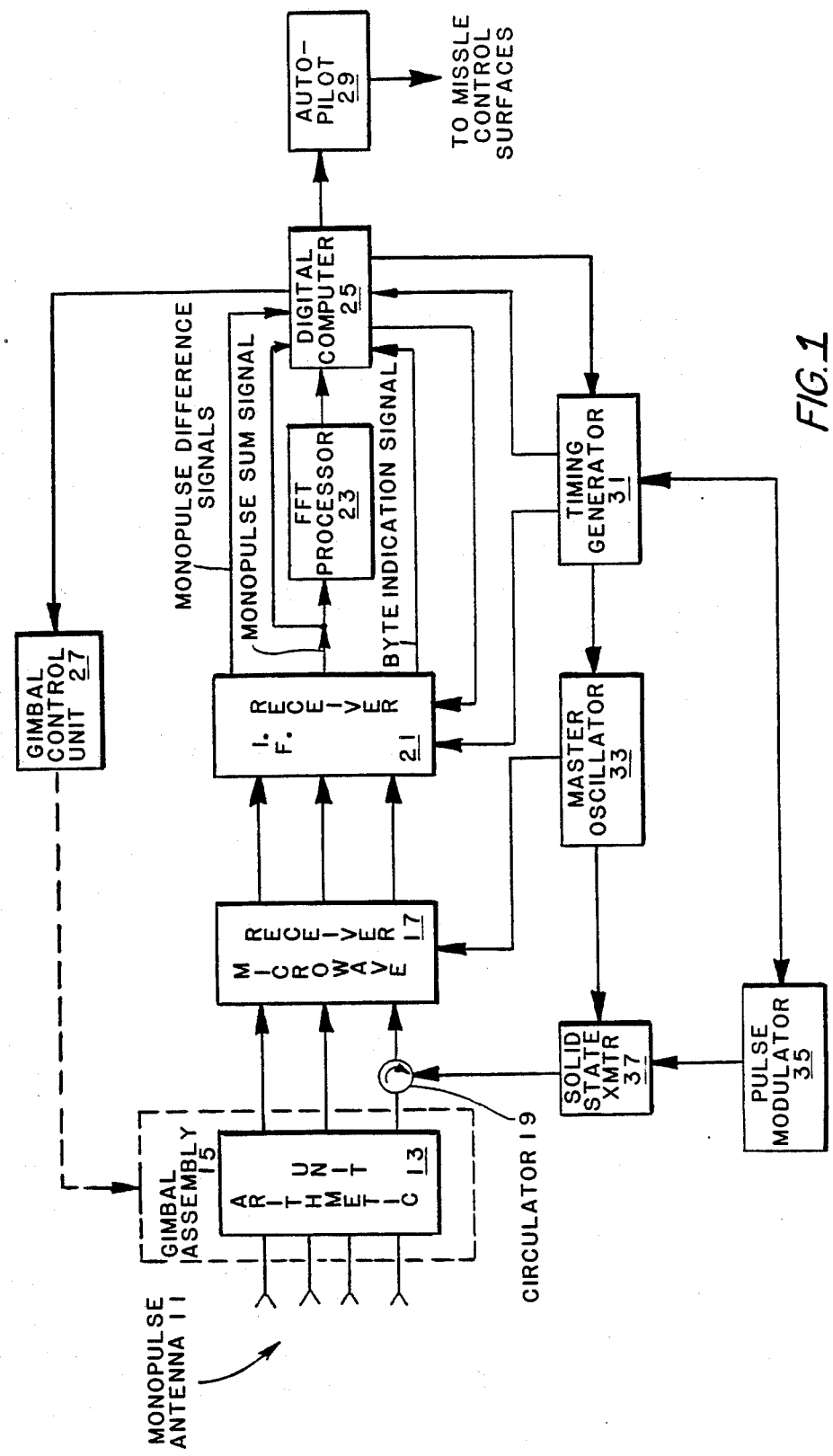
FIG. 1 is a simplified block diagram of an active seeker for a guided missile, such seeker incorporating a pulse Doppler receiver according to this invention.

Referring now to FIG. 1, an active radar seeker 10 is shown to include a monopulse antenna 11 and a monopulse arithmetic unit 13 mounted on a gimbal assembly 15. Monopulse pitch and yaw error signals developed within the monopulse arithmetic unit 13 are passed, via rotary joints (not shown), directly to a microwave receiver 17. The monopulse sum signal is passed to the microwave receiver 17, via a rotary joint (not shown), and a circulator 19. The microwave receiver 17 is of conventional design to provide preamplification and down-conversion of the monopulse sum, pitch and yaw signals to a first intermediate frequency (I.F.) of, say, 300 MHz. Such I.F. signals are passed to an I.F. receiver 21 to be described in greater detail hereinbelow; suffice it to say here that that receiver is effective to provide Doppler filtering, range-gating and analog-to-digital (A/D) conversion of the monopulse sum, pitch and yaw error signals, as well as a split gate range error signal. In addition, the I.F. receiver 21 also contains a comparator/control logic network (FIG. 3). Digitized monopulse signals and a range error signal from the I.F. receiver 21 are passed to a Fast Fourier Transform (FFT) processor 23. That processor may, for example, be similar to the one described in Shapiro et al, U.S. Pat. No. 3,875,391 issued Apr. 1, 1975 and assigned to the same assignee as the present application. The FFT signal processor 23 operates in a known manner to analyze signals to produce signals indicative of the frequency spectrum of the digitized monopulse signals, from which the Doppler frequency of targets may be derived. The output signals from the FFT processor 23 are applied to a digital computer 25. Such computer may, for example, be similar to the one shown in U.S. Pat. No. 4,037,202, inventor John Terzian, issued July 19, 1977 and assigned to the same assignee as the present application. Such digital computer 25 responds to the signals out of the FFT processor 23 to produce appropriate command signals for a gimbal control unit 27 and an autopilot 29 (both of which are conventional) to position the gimbal assembly 15 and to develop control signals for the missile control surfaces (not shown) as required. In addition, the digital computer 25 produces control signals for a timing generator 31 and the I.F. receiver 21. It is noted here in passing that the requisite tracking loops (not shown) are closed through the FFT processor 23 and the digital computer 25. Therefore, the digital computer 25 also provides a control signal to the I.F. receiver 21 for tuning a voltage-controlled oscillator (FIG. 2A), as will be described in detail hereinbelow.

A master oscillator 33, a pulse modulator 35, and a solid state transmitter 37 complete the seeker 10. The first two of the just-named elements are conventional and are effective together to provide a pulsed x-band continuous wave (C.W.) signal for amplification in the solid state transmitter 37. The latter may, for example, be similar to the one shown in U.S. Pat. No. 4,172,240, inventor George Jerinic, issued Oct. 23, 1979 and assigned to the same assignee as the present application.

Figure 2A:
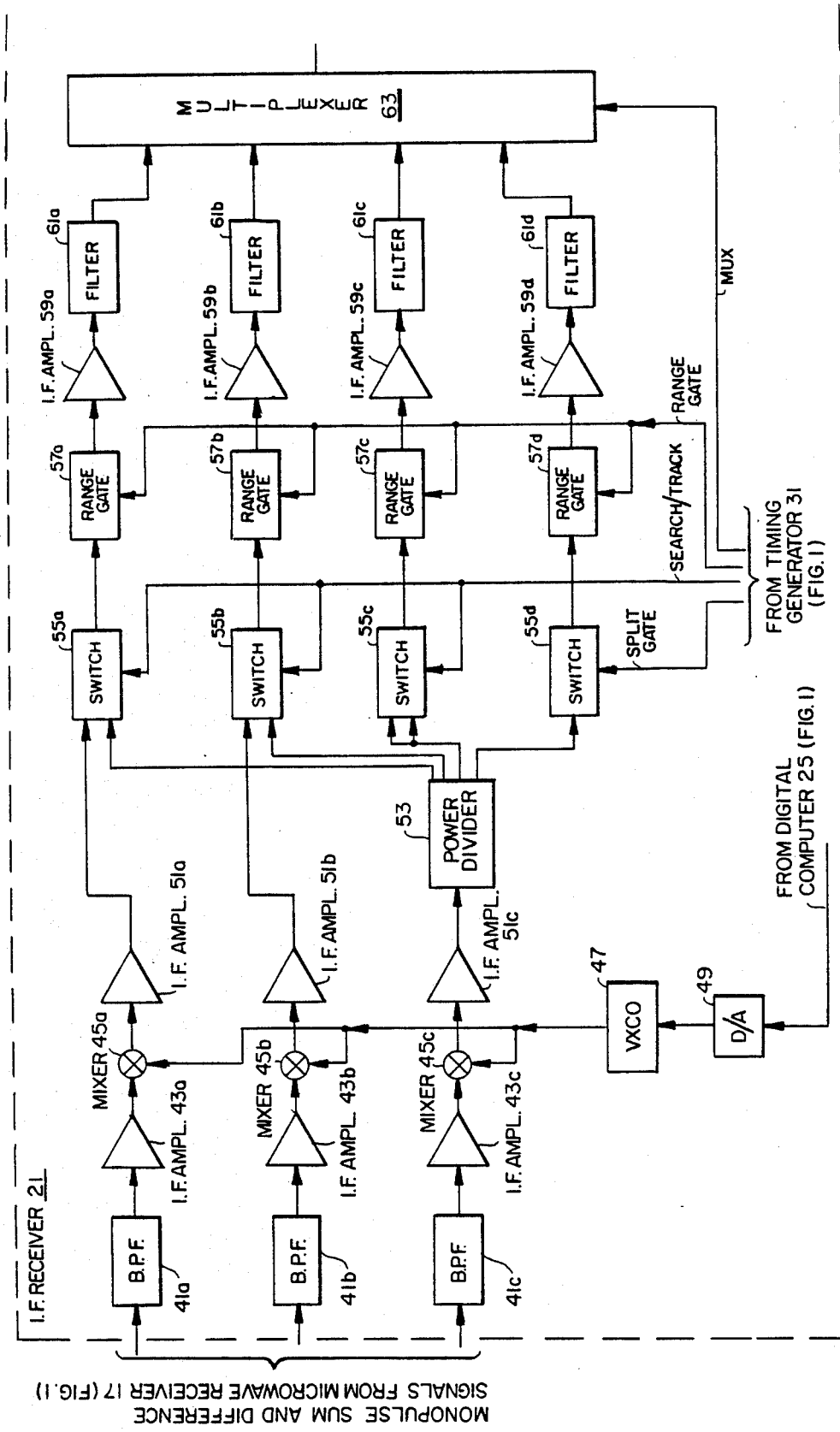
FIGS. 2A and 2B, taken together, constitute a simplified block diagram of an I.F. receiver section for the pulse Doppler receiver of FIG. 1, such diagram also showing how video signals are processed according to the invention.
Figure 2B:
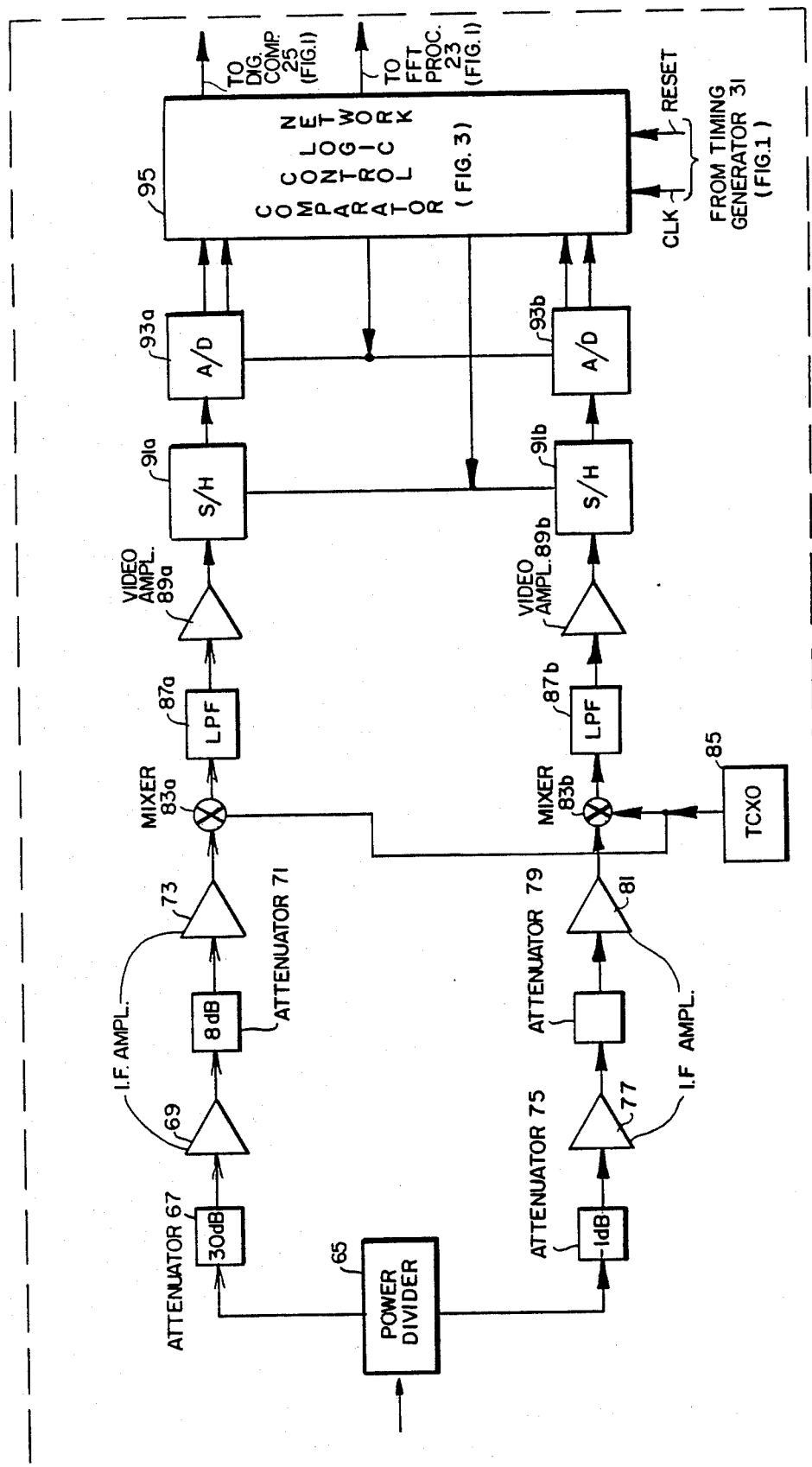

Referring now to the details of the I.F. receiver 21 in FIGS. 2A and 2B, the monopulse signals from the microwave receiver 17 (FIG. 1) are passed as shown through bandpass filters 41a, 41b and 41c wherein "out of band" signals are rejected. The resulting filtered signals are passed, via I.F. amplifiers 43a, 43b, 43c to mixers 45a, 45b and 45c, for down-conversion to a second I.F. frequency of, say, 30 MHz. The reference signals to the mixers 45a, 45b, 45c are obtained from a voltage-controlled crystal oscillator 47, the frequency of such signals are determined by a DOPPLER TRACK control signal derived from the digital computer 25 (FIG. 1) through operation of a digital-to-analog (D/A) converter 49. It will be appreciated that the DOPPLER TRACK control signal is effective to adjust the frequency of the VCXO 47 so that the second I.F. signal will be centered in the passband (here 16 KHz wide) of roughing filters 61a, 61b, 61c and 61d.

The second I.F. signals from mixers 45a, 45b and 45c are amplified in I.F. amplifiers 51a, 51b and 51c. The second I.F. signal (which corresponds to the monopulse sum channel signal) from I.F. amplifier 51c is passed to a power divider 53 wherein it is split into four equal I.F. signals applied as shown to switches 55a, 55b, 55c and 55d. The monopulse pitch and yaw error signals from I.F. amplifiers 51a, 51b are also applied, respectively, to switches 55a and 55b. Switches 51a, 51b, 51c, controlled as shown by a SEARCH/TRACK control signal from the timing generator 31 (FIG. 1), are effective to gate the sum channel signal through in the SEARCH mode and the pitch and yaw error signals in the TRACK mode. Switch 55c is provided for phase and amplitude matching purposes, while switch 55d is included to allow split gate range tracking controlled by a control signal labeled SPLIT GATE from the digital computer 25 (FIG. 1) via the timing generator 31 (FIG. 1). It is noted here that switch 55d is actually a 0/180 degree phase shifter used to phase modulate the sum channel signal to provide a split gate range tracking signal. The I.F. signals from switches 55a, 55b, 55c and 55d are passed, via range gates 57a, 57b, 57c and 57d and I.F. amplifiers 59a, 59b, 59c and 59d, to roughing filters 61a, 61b, 61c and 61d. The latter, as noted above, have a bandwidth of 16 KHz to reject all undesired signals outside the Doppler spectrum of a selected target. The I.F. signals from the roughing filters 61a, 61b, 61c and 61d are applied to an I.F. multiplexer 63 to be time-multiplexed into a single channel in response to command signals (labeled MUX) from the timing generator 31 (FIG. 1). The multiplexed I.F. signals from the multiplexer 63 are passed to a power divider 65 which divides such signals into two channels (not numbered) which are offset in gain by 36 dB. Thus, a 30 dB attenuator 67, a pair of I.F. amplifiers 69, 73 and an 8 dB attenuator 71 are provided in the first one of the channels and a pair of 1 dB attenuators 75, 79 and a pair of I.F. amplifiers 77, 81 (identical in gain to amplifiers 69, 73) are provided in the second channel. It is noted here in passing that the 1 dB attenuators 75, 79 are included in the second channel to allow for phase tracking between the two channels. That is to say, to achieve phase tracking between the two channels over a range of temperatures, identical I.F. amplifiers 69, 73, 77 and 81 are incorporated in the channels, and to provide a 36 dB offset between the two channels the attenuators 67, 71, 75, 79 are incorporated in the channels, as shown. The I.F. signals from I.F. amplifiers 73, 81 are passed to a pair of mixers 83a, 83b for downconversion to video signals by being heterodyned with a reference signal supplied by a temperature-compensated crystal oscillator (TCXO) 85. The video signals from the mixers 83a, 83b are applied to a pair of 300 KHz low pass filters 87a, 87b which serve to reject undesired mixer products and broadband noise.

Digressing briefly here now for a moment, it will be appreciated that means for accommodating signals within a wide dynamic range without distortion due to saturation or phase shift must be provided. Thus, in the receiver shown in U.S. Pat. No. 4,208,632 (Sheldon et al), time-multiplexed I.F. signals are passed through four similar, but separate, amplifier channels which differ only in that each has a gain to accommodate signals whose amplitude lies in a different portion of the dynamic range of possible signals. Thus, each amplifier channel, in digital terms, covers an 8 bit dynamic range with 5 bit overlap between successive channels for a total dynamic range of 17 bits or 102 dB. The outputs from the four video channels are sampled and held in sample and hold (S/H) circuits and an analog window comparator is used to select the output from one of the S/H's. The output from the selected one of the S/H's is digitized by an 8 bit A/D converter and passed to an FFT signal processor along with a 2 bit word indicating from which of the channels the output signal was selected. The effect then is to divide the dynamic range of the I.F. input signal into four overlapping 48 dB ranges (48 dB being the dynamic range of an 8 bit A/D converter) to achieve an overall dynamic range of 102 dB. The overlap between channels is effective to eliminate undesired discontinuities when the amplitude of the input signal is such that selection between adjacent receivers is necessary. In order to reconstruct the selected signal with proper magnitude, the signal processor multiplies the value of the output from the 8 bit A/D by eight raised to the number of the channel selected. Gain and phase errors between adjacent channels, however, distort reconstruction when the signal amplitude varies between channels.

With the foregoing in mind, it may be seen that the filtered signals from the low pass filters 87a, 87b are applied, via video amplifiers 89a, 89b with 30 dB gain, to 12 bit S/H's 91a, 91b. The outputs from the latter are digitized by 12 bit A/D converters 93a, 93b prior to being passed to a digital comparator/control logic network 95. The latter will be described in detail hereinbelow with reference to FIG. 3; suffice it to say here that that unit is provided to maintain an 8 bit data transfer to the FFT processor 23 (FIG. 1). Thus, the comparator/control logic network 95 is effective to divide the 24 bits of input data into four 8 bit channels, each separated by 18 dB, and to pass a selected one of those 8 bit channels, together with a 2 bit word indicating which channel is being reported, to the FFT signal processor 23 (FIG. 1). It is noted here in passing that the A/D's 93a, 93b also provide an END OF CONVERT (EOC) signal to the digital comparator/control logic network 95 for reasons to be explained in detail hereinbelow.

Referring now to FIG. 3, the construction and operation of the comparator/control logic network 93 will be explained. Thus, a timing control counter 97 is provided to operate under the control of a RESET and CLK signal from the timing generator 31 (FIG. 1) and EOC signals from the A/Ds 93a, 93b. The RESET command is synchronous with the MUX gate command from the timing generator 31 (FIG. 1) to the I.F. multiplexer 63 (FIG. 2A). That is to say, successive RESET commands occur every 5.2 microseconds, equalling the duration of the time-multiplexed pitch and yaw error signals, the sum signals and the split-gate sum (range error) signals contained in the signals out of the I.F. multiplexer 63 (FIG. 2A). The RESET command then is effective to reset the counter 97 to accommodate each new data input. The CLK signals provided to the timing control counter 97 are passed therethrough to become the clocking signals to the A/D converters 93a, 93b (FIG. 2B). The S/H CMND signal provided to the S/Hs 91a, 91b (FIG. 2B) are derived by the timing control counter 97 from the RESET command. The EOC signals applied by the A/D converters 93a, 93b (FIG. 2B) to the timing control counter 97 indicate completion of each conversion process. In response to the EOC signals, the timing control counter 97 provides ENABLE commands to a pair of flip/flops (F/F) 99a, 99b.

The output signals from the A/D converters 93a, 93b (FIG. 2B) consist of 12 bits of serial data with the sign bit as the first bit and the least significant bit (LSB) as the last bit. The sign bits from A/D converters 93a, 93b (FIG. 2B) are loaded, respectively, into F/Fs 99a, 99b wherein they are utilized to determine whether or not the data from the former should be inverted by inverters 101a, 101b prior to being loaded into serial shift registers 103a, 103b. Thus, the F/Fs 99a, 99b store the sign bits and either enable or disable the data inverters 101a 101b, depending upon the value of the stored bit. That is to say, if the sign bit is positive, indicating positive data, the F/Fs 99a, 99b enable the associated data inverter to invert the corresponding data. Positive data are inverted to insure that only the magnitude of the data is compared within a byte selector network 105. It should be noted here in passing that the inverter ENABLE signals from the F/Fs 99a, 99b are also passed to an output control logic network 111 for reasons to be made clear hereinbelow. When the data inverters 101a, 101b are properly set, the timing control counter 97 clocks the data (exclusive of the sign bits) from the A/D converters 93a, 93b (FIG. 2B) through the inverters 101a, 101b and into the serial shift registers 103a, 103b. Such registers here are 10 bit devices, meaning that the least significant bits (LSBs) of the data from the A/D converters 93a, 93b (FIG. 2B) are ignored.

Figure 4:
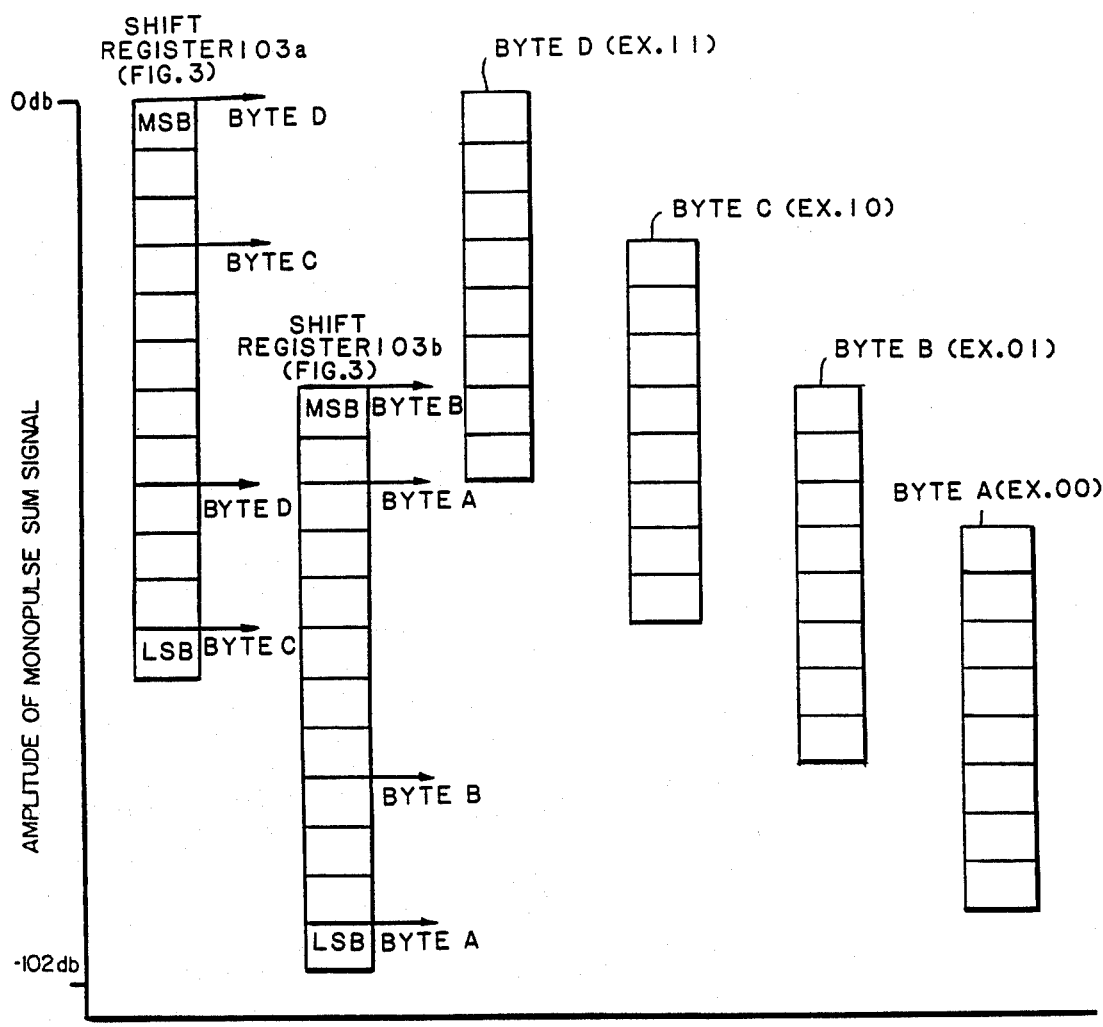
FIG. 4 is a sketch useful in understanding how the comparator/control logic network of FIG. 3 divides its two input channels into four output channels.

Referring now to both FIGS. 3 and 4, and recalling that the purpose of the comparator/control logic network 95 is to divide the 24 bits of input data into four 8 bit channels, each separated by 18 dB, the latter is effective to arrange the 12 bit input data from A/D converter 93a (FIG. 2B) into two 8 bit data bytes (labeled A and B in FIG. 4) within the 10 bit serial shift register 103b. In like manner, the 12 bit data from A/D converter 93b (FIG. 2B) are arranged into two 8 bit data bytes (labeled "C" and "D" in FIG. 4) within the shift register 103a. It will be appreciated that the MSBs from A/D converters 93a, 93b (FIG. 2B) are stored in F/Fs 99a, 99b, respectively, and that the LSBs from the former are not utilized. Upon completion of the data load into the shift registers 103a, 103b, the byte selector network 105 is enabled by the timing control counter 97 and each one of the four 8 bit data bytes A, B, C and D is examined to determine if it is saturated. Saturation is defined as all 8 bits of a byte being at the logic one level. The byte selector network 105 selects the data byte above the highest data byte which is saturated. For example, if data byte A is saturated and bytes B, C and D are not, then data byte B is selected. Data bytes A, B, C and D, in addition to being applied to the byte selector network 105, are also applied to a first one of the terminals on AND gates 107a, 107b, 107c and 107d, respectively. The byte selector network 105 enables the AND gate corresponding to the data byte selected to allow that byte to be passed, via an OR gate 109 and the output control logic network 111, to the FFT signal processor 40 (FIG. 1). The output control logic network 111 also receives the ENABLE signals from F/Fs 99a, 99b which are used by the former to invert the output data if that data were inverted during the data input sequence. The output control logic network 111 also contains a resynchronizing flip/flop (not shown) which is used to synchronize the output data to the clock signal from the timing generator 31 (FIG. 1). The exponent bits corresponding to the particular channel selected by the byte control network 105 are sent to the FFT processor 23 (FIG. 1) synchronously with the data output from the output control logic network 111.

It will now be appreciated by those of skill in the art that the output data provided by the comparator/control logic network 95 to the FFT signal processor 23 (FIG. 1) should have less harmonic content that the data provided by the device described in U.S. Pat. No. 4,208,632 (Sheldon et al). That is to say, gain and phase errors between channels 0 and 1, as well as between channels 2 and 3 in the latter device, which result from the use of different amplifier stages, will here be reduced to linearity errors in the A/D converters 93a, 93b (FIG. 2B). Thus, although gain and phase errors may still exist for the transition between channels 1 and 2, their elimination from the transition between the other channels will improve the mean harmonic performance of the I.F. receiver 21 (FIG. 1).

The remaining elements of the block diagram of FIG. 3 illustrate one way in which the time multiplexed data out of the I.F. multiplexer 63 (FIG. 2A) may be passed around the comparator/control logic network 93 to provide monopulse sum and difference signals for normalization and to allow only the monopulse sum signal to be divided into 8 bit channels. Thus, the signals out of A/D converters 93A, 93B (FIG. 2B) are passed to switches 121a, 121b which are operated by the MUX command from the timing generator 31 (FIG. 1). Operation of such switch directs the portions of the signals out of the A/D converters 93A, 93B (FIG. 2B) indicative of monopulse difference signals to the digital computer 25 (FIG. 1) and the portions of such signals corresponding to monopulse sum signals 10 to inverters 101a, 101b.

The sequencing of data through the I.F. receiver 21 (FIG. 1) is identical to that described in U.S. Pat. No. 4,208,632 (Sheldon et al) and will therefore not be recounted here. Suffice it to say here that before any data from the multiplexer 63 (FIG. 2A) is digitized by the A/D converters 93a, 93b, sufficient time must be provided to allow the I.F. amplifiers 69, 73, 77 and 81 (FIG. 2B), the video amplifiers 89a, 89b (FIG. 2B) and the S/H circuits 91a, 91b (FIG. 2B) to settle. Once the foregoing have settled, A/D conversion, exponent decision and data output occur. Meanwhile, the cycle begins again with the next data sample from the multiplexer 63 (FIG. 2A) being applied to the S/H circuits 91a, 91b (FIG. 2B).

Having described a preferred embodiment of this invention, it will now be apparent to one of skill in the art that changes may be made without departing from the inventive concepts described. It is felt, therefore, that this invention should not be restricted to its preferred embodiment, but rather should be limited only by the spirit and scope of the appended claims.

What is claimed is:

1. In a monopulse receiver wherein range-gated monopulse sum and difference signals are processed in first and second channels having different overlapping dynamic ranges to produce time-multiplexed video signals, the amplitude of the video signals out of at least one of the channels being indicative of the amplitude of each one of the monopulse sum and difference signals, the improvement comprising:

(a) a sample and hold circuit disposed in each one of the first and second channels, each one of such circuits being responsive to the video signal in its channel to produce a D.C. signal indicative, when the video signal is within the dynamic range of its channel, of the amplitude of the video signal;

(b) an analog-to-digital converter in each one of the first and second channels, each one of such converters being responsive to the D.C. signal from the sample and hold circuit in its channel to produce digital words indicative of the amplitudes of the D.C. signal, which digital words then are also indicative of the amplitudes of the monopulse sum and difference signals;

(c) demultiplexing means disposed in each one of the first and second channels and responsive to the digital words out of the analog-to-digital converter in its channel for directing the digital words indicative of monopulse sum signals to a first processing path and the digital words indicative of monopulse difference signals to a second processing path;

(d) register means in the first path for storing the digital words indicative of the monopulse sum signals out of each one of the first and second channels;

(e) selector means, responsive to the digital words in the register means, for selecting a byte indicative of the amplitude of the larger one of the digital words linearly related to the amplitude of the monopulse sum signal along with an exponent indicative of the position of the selected byte; and (f) gating means, responsive to the selector means, for passing the digital words corresponding to the monopulse difference signals associated with the digital word from which the selected byte was derived to a digital computer.

* * * * *